United States Patent
Eda et al.

(10) Patent No.: US 9,319,079 B2
(45) Date of Patent: Apr. 19, 2016

(54) RECEPTION QUALITY MEASURING APPARATUS AND RECEPTION QUALITY MEASURING METHOD

(71) Applicant: NEC Corporation, Tokyo (JP)

(72) Inventors: Shintaro Eda, Tokyo (JP); Kengo Oketani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/429,229

(22) PCT Filed: Apr. 9, 2013

(86) PCT No.: PCT/JP2013/002409
§ 371 (c)(1),
(2) Date: Mar. 18, 2015

(87) PCT Pub. No.: WO2014/045483
PCT Pub. Date: Mar. 27, 2014

(65) Prior Publication Data
US 2015/0222307 A1    Aug. 6, 2015

(30) Foreign Application Priority Data
Sep. 18, 2012    (JP) .................. 2012-204459

(51) Int. Cl.
*H04B 1/10*    (2006.01)
*H04B 17/00*   (2015.01)
(Continued)

(52) U.S. Cl.
CPC .............. *H04B 1/1027* (2013.01); *H04B 17/00* (2013.01); *H04L 25/022* (2013.01);
(Continued)

(58) Field of Classification Search
CPC ........ H04B 1/123; H04B 7/002; H04B 1/109; H04B 1/1036; H04L 1/06; H04L 25/0204; H04L 25/03038; H04L 27/2647; H04L 2025/03414; H04L 25/03057
USPC .................. 375/229–236, 316–352, 224–228
See application file for complete search history.

(56) References Cited

U.S. PATENT DOCUMENTS 6,404,826 B1   6/2002 Schmidl et al.
6,907,049 B1   6/2005 Tamura
(Continued)

FOREIGN PATENT DOCUMENTS

CN    1287417    3/2001
CN    1365545    8/2002
(Continued)

OTHER PUBLICATIONS

International Search Report, PCT/JP2013/002409, Jun. 4, 2013.
(Continued)

*Primary Examiner* — James M Perez
(74) *Attorney, Agent, or Firm* — Young & Thompson (57) ABSTRACT

A reception quality measuring apparatus (100) including: an equalizing processing unit (1) for performing an equalizing process on a reception signal to derive an equalized reception signal; lattice distance estimating element (2) for deriving a lattice distance estimation value using the equalized reception signal; an RSSI estimating unit (3) for deriving an RSSI estimation value using the lattice distance estimation value; an ISSI estimating unit (4) for deriving an ISSI estimation value by subtracting the RSSI estimation value from the lattice distance estimation value; and a dividing unit (5) for deriving an SIR representing reception quality by dividing the RSSI estimation value by the ISSI estimation value.

10 Claims, 4 Drawing Sheets

(51) Int. Cl.
  H04L 25/02 (2006.01)
  H04L 25/03 (2006.01)
  H04L 27/26 (2006.01)

(52) U.S. Cl.
  CPC ....... H04L 25/0202 (2013.01); H04L 25/0204 (2013.01); H04L 25/03159 (2013.01); *H04L 27/2647* (2013.01); *H04L 2025/03414* (2013.01); *H04L 2025/03636* (2013.01)

(56) References Cited

U.S. PATENT DOCUMENTS

| | | | |
|---|---|---|---|
| 7,941,099 B2 | 5/2011 | Montalbano | |
| 2003/0012261 A1 | 1/2003 | Toda | |
| 2003/0095511 A1 | 5/2003 | Muraoka | |
| 2005/0032523 A1 | 2/2005 | Tamura | |
| 2006/0280257 A1* | 12/2006 | Kim | 375/267 |
| 2007/0230599 A1 | 10/2007 | Koga et al. | |
| 2008/0318530 A1* | 12/2008 | Montalbano | 455/67.13 |
| 2009/0086860 A1 | 4/2009 | Higashinaka | |

FOREIGN PATENT DOCUMENTS

| | | |
|---|---|---|
| CN | 101023591 | 8/2007 |
| JP | 2000-049700 | 2/2000 |
| JP | 2002-111771 | 4/2002 |
| JP | 2003-158487 | 5/2003 |
| JP | 2006-319900 | 11/2006 |
| JP | 2008-507230 | 3/2008 |
| JP | 2011-193221 | 9/2011 |
| WO | 2007-020745 | 2/2007 |

OTHER PUBLICATIONS

A. Ito et al., Channel Estimation for SIR Measurement in HSDPA Systems, 2007 IEEE 66th Vehicular Technology Conference, VTC-2007 Fall, pp. 1012-1016.

Chinese Office Action dated Oct. 29, 2015, with English Translation; Application No. 201380048586.2.

JP Office Action, dated Dec. 15, 2014; Application No. 2014-536552.

* cited by examiner

THE NUMBER OF SUBCARRIERS

RECEPTION QUALITY MEASURING APPARATUS AND RECEPTION QUALITY MEASURING METHOD

TECHNICAL FIELD

The present invention relates to a reception quality measuring apparatus and a reception quality measuring method.

BACKGROUND ART

In a mobile communication system, the propagation environment varies under the influence of fading. Therefore, it is necessary to transmit a signal in accordance with the propagation environment.

As means for controlling a transmission signal, techniques such as adaptive modulation and coding (AMC), transmit power control (TPC) and the like have been used.

The adaptive modulation and coding is transmission signal control means for adaptively controlling the modulation scheme and the code rate which are optimum for a mobile communication terminal apparatus. Further, the transmit power control is transmission signal control means for controlling the transmission power of the transmission signal of a mobile communication terminal.

In the adaptive modulation and coding and the transmit power control, the modulation scheme, the code rate, or the transmission power is controlled such that the optimum transmission signal can be transmitted based on the quality of a reception signal (hereinafter referred to as "the reception quality"). Accordingly, it is necessary to estimate the reception quality at the receiver apparatus.

Patent Literatures 1 and 2 each disclose technique of measuring, as the reception quality, a desired signal to interference signal ratio (hereinafter referred to as "the SIR (Signal to Interference power Ratio)") from the desired signal level (hereinafter referred to as "the RSSI (Received Signal Strength Indicator)") and the interference signal level (hereinafter referred to as "the ISSI (Interference Signal Strength Indicator)") of a reception signal.

CITATION LIST

Patent Literature 1: Japanese Unexamined Patent Application Publication No. 2003-158487
Patent Literature 2: Japanese Unexamined Patent Application Publication No. 2002-111771

SUMMARY OF INVENTION

Technical Problem

However, according to Patent Literature 1, in order to estimate the ISSI, it is necessary to weight each of a past-estimated ISSI and a currently estimated ISSI, and to add up. Therefore, the calculation amount becomes disadvantageously great.

Further, according to Patent Literature 2, the noise level (which bears the meaning equivalent to the ISSI) is estimated by performing error correction to an estimation value obtained by approximately estimating the grid point interval. However, since the grid point interval is approximately estimated, the error becomes disadvantageously great. Then, in order to correct such an error, the calculation amount or the circuit scale becomes disadvantageously great.

Still further, with the conventional reception quality measuring apparatus, an ISSI estimation value is derived by subtracting an RSSI estimation value from the total reception power estimation value. Still further, an addition average value of the electric power of an equalized reception signal is derived using the number of subcarriers in the signal band, and the average value is employed as the total reception power estimation value. Note that, the equalized reception signal is obtained by performing an equalizing process on a reception signal. Therefore, the calculation amount of the addition averaging process in deriving the total reception power estimation value becomes disadvantageously great.

Solution to Problem

According to the first aspect of the invention,
a reception quality measuring apparatus comprising:
equalizing processing means for performing an equalizing process on a reception signal to derive an equalized reception signal;
lattice distance estimating means for deriving a lattice distance estimation value using the equalized reception signal;
RSSI estimating means for deriving an RSSI estimation value using the lattice distance estimation value;
ISSI estimating means for deriving an ISSI estimation value by subtracting the RSSI estimation value from the lattice distance estimation value; and
dividing means for deriving an SIR representing reception quality by dividing the RSSI estimation value by the ISSI estimation value.

According to the second aspect of the invention,
a reception quality measuring method comprising:
performing an equalizing process on a reception signal to derive an equalized reception signal;
deriving a lattice distance estimation value using the equalized reception signal;
deriving an RSSI estimation value using the lattice distance estimation value;
deriving an ISSI estimation value by subtracting the RSSI estimation value from the lattice distance estimation value; and
deriving an SIR representing reception quality by dividing the RSSI estimation value by the ISSI estimation value.

Advantageous Effects of Invention

According to the present invention, the reception quality of a reception signal can be measured with a smaller calculation amount.

DESCRIPTION OF EMBODIMENTS

In the following, a description will be given of an embodiment of the present invention with reference to the drawings. Note that, the present invention is not limited to the following embodiment.

First Embodiment

Figure 1:
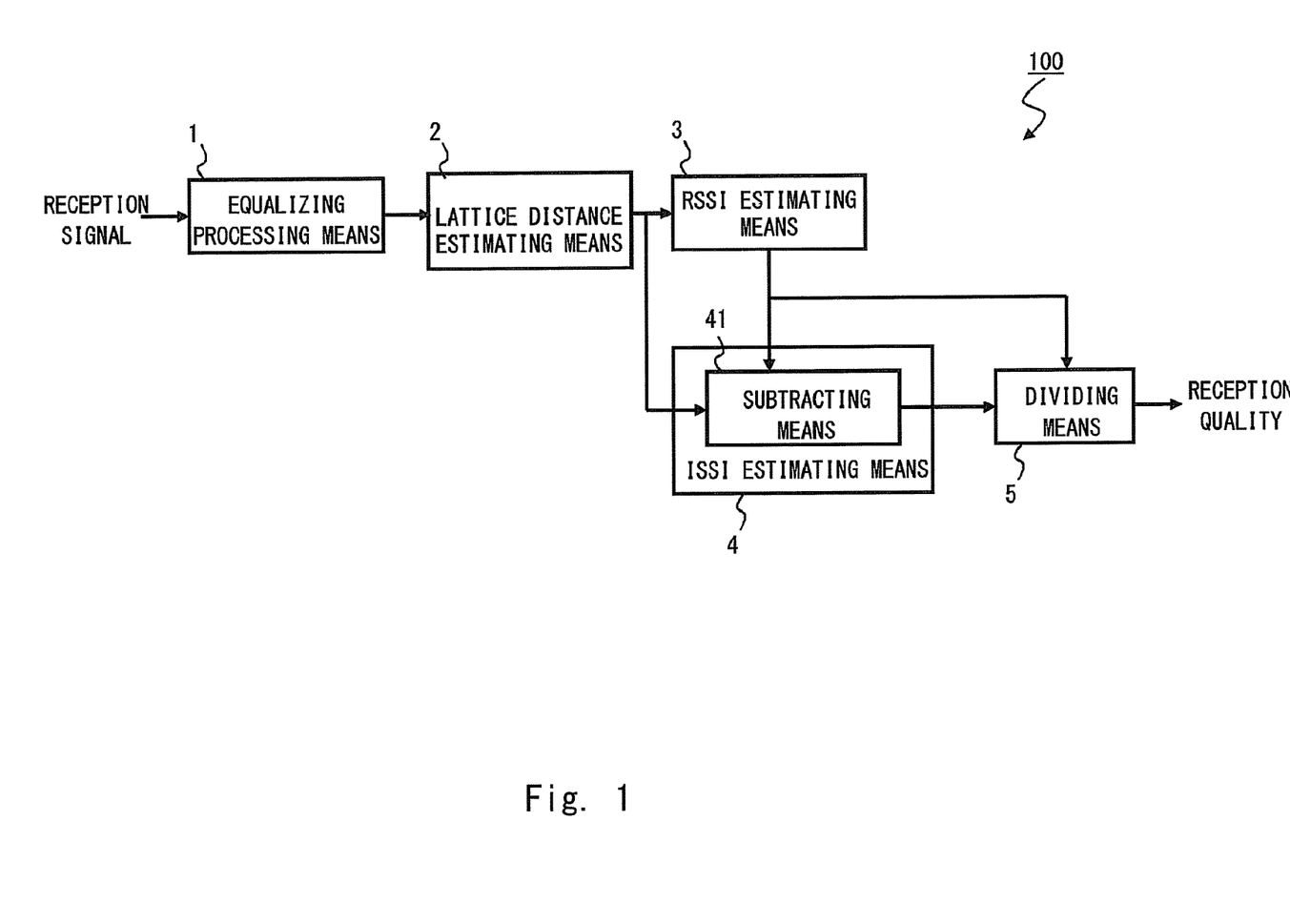
FIG. 1 is a block diagram showing one example of a reception quality measuring apparatus according to a first embodiment.

As shown in FIG. 1, a reception quality measuring apparatus 100 according to a first embodiment of the present invention includes equalizing processing means 1, lattice distance estimating means 2, RSSI estimating means 3, ISSI estimating means 4, dividing means 5 and the like.

Further, the reception quality measuring apparatus 100 includes a computer (not shown) or the like that includes a CPU (Central Processing Unit; not shown) or the like. Then, by the CPU executing a program for realizing various functions of the reception quality measuring apparatus 100, the various functions of the reception quality measuring apparatus 100 are realized. Specifically, by the CPU executing a program for realizing the various functions of the reception quality measuring apparatus 100, it functions as the equalizing processing means 1, the lattice distance estimating means 2, the RSSI estimating means 3, the ISSI estimating means 4, the dividing means 5 and the like.

Figure 2:
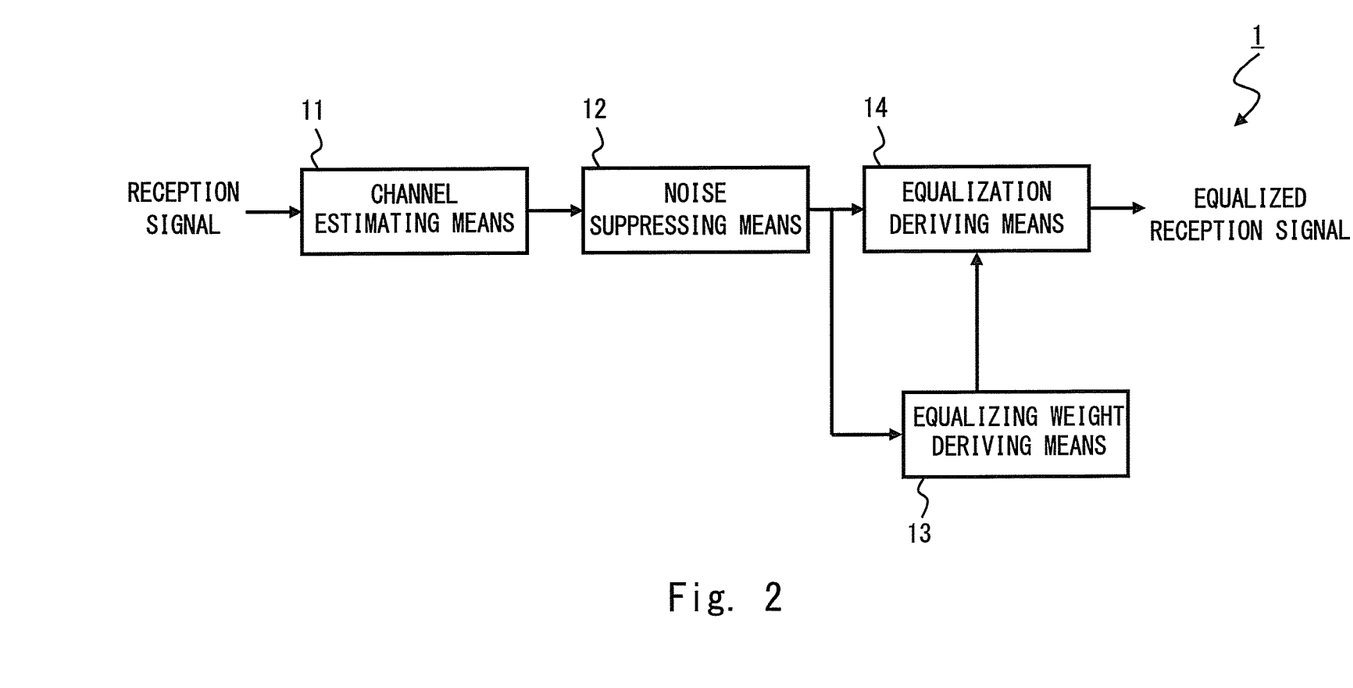
FIG. 2 is a block diagram showing one example of an equalizing processing unit according to the first embodiment.

As shown in FIG. 2, the equalizing processing means 1 includes channel estimating means 11, noise suppressing means 12, equalizing weight deriving means 13, equalization deriving means 14 and the like.

Then, the equalizing processing means 1 performs an equalizing process on a reception signal.

Firstly, a description will be given of the equalizing process performed by the equalizing processing means 1.

The channel estimating means 11 estimates a channel estimation value H'(k) using a reception signal (k is a positive integer satisfying 0≤k≤N−1, where N is the number of subcarriers in the signal band). Here, the reception signal input to the channel estimating means 11 is converted from the radio frequency to the baseband frequency.

Further, the channel estimating means 11 inputs the channel estimation value H'(k) to the noise suppressing means 12.

The noise suppressing means 12 performs a noise suppressing process on the channel estimation value H'(k). For example, the noise suppressing means 12 estimates the channel of each subcarrier using the channel estimation value H'(k); derives the average value of the channels of all the subcarriers; and employs the average value as a channel estimation value having undergone the noise process H(k) (k is a positive integer satisfying 0≤k≤N−1, where N is the number of subcarriers in the signal band). Here, the number of subcarriers is an arbitrary value. Based on the previously acquired characteristic of a reception signal or the like, the value is set by a user or the like so as to achieve the optimum characteristic.

Further, the noise suppressing means 12 inputs the channel estimation value having undergone the noise process H(k) to the equalizing weight deriving means 13 and the equalization deriving means 14.

The equalizing weight deriving means 13 derives an equalizing weight W(k) using the channel estimation value having undergone the noise process H(k) (k is a positive integer satisfying 0≤k≤N−1, where N is the number of subcarriers in the signal band). In deriving the equalizing weight W(k), for example, an algorithm such as the minimum mean square error (MMSE) method can be used. More specifically, the equalizing weight deriving means 13 derives the weight with which the error (mean square error) between the channel estimation value having undergone the noise process H(k) and a predetermined channel estimation value is minimized, and employs the weight as the equalizing weight W(k).

Further, the equalizing weight deriving means 13 inputs the equalizing weight W(k) to the equalization deriving means 14.

The equalization deriving means 14 multiplies the channel estimation value having undergone the noise process H(k) and the equalizing weight W(k) together for each subcarrier, to derive an equalized reception signal Y(k) (k is a positive integer satisfying 0≤k≤N−1, where N is the number of subcarriers in the signal band).

Further, the equalization deriving means 14 inputs the equalized reception signal Y(k) to the lattice distance estimating means 2.

The equalized reception signal Y(k) derived by the equalization deriving means 14 is expressed by the following Equation (1).

[Mathematical Expression 1]

$$Y(k)=W(k)H(k) \qquad (1)$$

Next, a description will be given of the processes performed by the lattice distance estimating means 2, the RSSI estimating means 3, the ISSI estimating means 4, and the dividing means 5.

The lattice distance estimating means 2 derives a lattice distance estimation value LD using the equalized reception signal Y(k). The lattice distance estimation value LD is expressed by the following Equation (2).

[Mathematical Expression 2]

$$LD = \mathrm{real}\left(\frac{1}{N}\sum_{k=0}^{N-1} Y(k)\right) \qquad (2)$$

Note that, in Equation (2), real(X) represents the real part of X. Further, the lattice distance estimating means 2 inputs the lattice distance estimation value LD to the RSSI estimating means 3 and the ISSI estimating means 4.

The RSSI estimating means 3 derives an RSSI (Received Signal Strength Indicator) estimation value using the lattice distance estimation value LD. The RSSI estimation value is expressed by the following Equation (3).

[Mathematical Expression 3]

$$RSSI = \left(\mathrm{real}\left(\frac{1}{N}\sum_{k=0}^{N-1} Y(k)\right)\right)^2 = LD^2 \qquad (3)$$

The RSSI estimation value is an electric power value obtained by subjecting the equalized reception signal Y(k) to in-phase addition by the number of subcarriers in the signal band, and can be expressed only by the lattice distance estimation value LD as shown in Equation (3). Note that, in Equation (3), real(X) represents the real part of X, and RSSI represents the RSSI estimation value.

Further, the RSSI estimating means 3 inputs the RSSI estimation value to the ISSI estimating means 4 and the dividing means 5.

The ISSI estimating means 4 is structured solely by the subtracting means 41. The ISSI estimating means 4 derives the ISSI (Interference Signal Strength Indicator) estimation value using the lattice distance estimation value LD and the RSSI estimation value.

More specifically, the subtracting means 41 subtracts the RSSI estimation value from the lattice distance estimation value LD, to derive the ISSI estimation value. In other words, the difference obtained by subtracting the RSSI estimation value of the equalized reception signal Y(k) from the lattice distance estimation value LD of the equalized reception signal Y(k) can be regarded as the ISSI estimation value. This is because the expected value of the electric power of the equalized reception signal Y(k) can be expressed by the grid point interval LD. This is explained in detail in the following.

Further, the ISSI estimating means 4 inputs the ISSI estimation value to the dividing means 5.

The dividing means 5 divides the RSSI estimation value by the ISSI estimation value, to derive a desired signal to interference signal ratio (SIR: Signal to Interference power Ratio) which represents the reception quality.

Next, a description will be given of the reason why the ISSI estimation value can be derived just by subtracting the RSSI estimation value from the lattice distance estimation value LD in the process performed by the ISSI estimating means 4.

First, the expected value of the electric power of the equalized reception signal Y(k) can be expressed by Equation (4).

[Mathematical Expression 4]

$$\text{EXPECTED VALUE OF ELECTRIC POWER} = E[|Y(k)|^2] \quad (4)$$

Expanding Equation (4), the following Equation (5) is obtained.

[Mathematical Expression 5]

$$\begin{aligned}\text{MATHEMATICAL EXPRESSION(4)} &= \\ E[|W(k)H'(k)|^2] &= E[|W(k) \times (H(k) + n(k))|^2] = \\ E[W(k) \times (H(k) + n(k)) \times (H^*(k) + n^*(k)) \times W^*(k)] &= \\ E[W(k) \times (H(k)H^*(k) + n(k)n^*(k)) \times W^*(k)] &= \\ E[W(k)H'(k)] &= \text{real}\left(\frac{1}{N}\sum_{k=0}^{N-1} Y(k)\right) = LD\end{aligned} \quad (5)$$

Note that, in Equation (5), E(X) represents the expected value of X, and real(X) represents the real part of X. Further, in Equation (5), n(k) represents the noise vector, n*(k) represents the complex conjugate transpose of the noise vector, and W*(k) represents the complex conjugate transpose of the equalizing weight W(k).

From Equation (5), it can be seen that the expected value of the electric power of the equalized reception signal Y(k) can be expressed by the lattice distance estimation value LD.

Further, the expected value of the electric power of the equalized reception signal Y(k) is the sum of the RSSI estimation value and the ISSI estimation value. Therefore, the lattice distance estimation value LD can be expressed by the following Equation (6).

[Mathematical Expression 6]

$$LD = RSSI + ISSI \quad (6)$$

Note that, in Equation (6), ISSI represents the ISSI estimation value, and RSSI represents the RSSI estimation value.

Then, modifying Equation (6) using Equation (3), the ISSI estimation value can be expressed by the following Equation (7).

[Mathematical Expression 7]

$$ISSI = LD - RSSI = LD - LD^2 \quad (7)$$

Accordingly, from Equation (7), the ISSI estimation value can be derived by subtracting the RSSI estimation value from the lattice distance estimation value LD. Note that, in Equation (7), ISSI represents the ISSI estimation value, and RSSI represents the RSSI estimation value.

Therefore, the ISSI estimating means 4 according to the first embodiment can derive the ISSI estimation value without the necessity of deriving the total reception power estimation value of the equalized reception signal Y(k).

First Comparative Example

Figure 3:
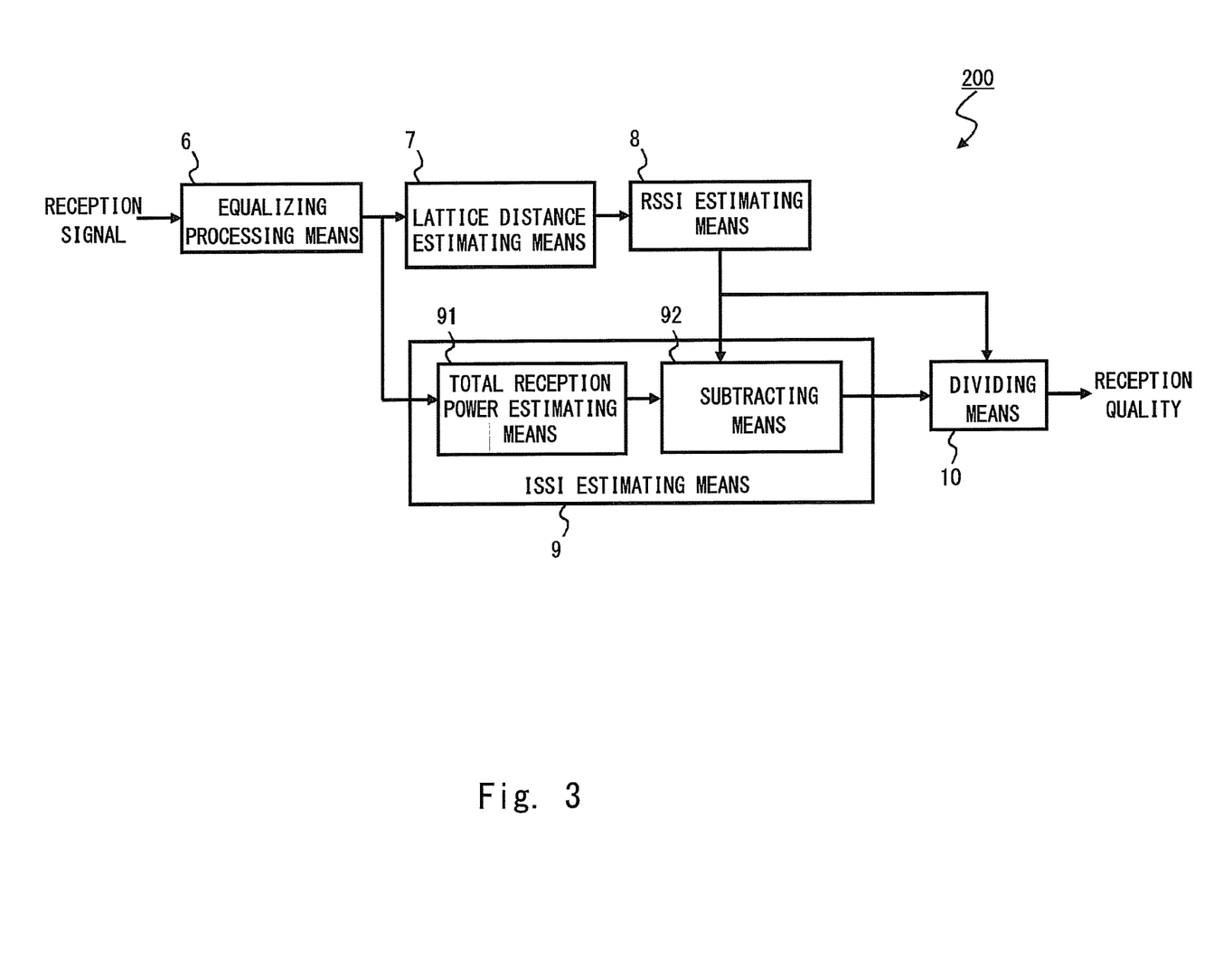
FIG. 3 is a block diagram showing one example of a reception quality measuring apparatus according to a first comparative example.

Next, a description will be given of a reception quality measuring apparatus 200 according to a first comparative example. As shown in FIG. 3, the reception quality measuring apparatus 200 according to the first comparative example includes equalizing processing means 6, lattice distance estimating means 7, RSSI estimating means 8, ISSI estimating means 9, dividing means 10 and the like.

Further, the reception quality measuring apparatus 200 includes a computer (not shown) or the like that includes a CPU (not shown) or the like. Then, by the CPU executing a program for realizing various functions of the reception quality measuring apparatus 200, the various functions of the reception quality measuring apparatus 200 are realized. Specifically, by the CPU executing a program for realizing the various functions of the reception quality measuring apparatus 200, it functions as the equalizing processing means 6, the lattice distance estimating means 7, the RSSI estimating means 8, the ISSI estimating means 9, the dividing means 10 and the like.

Figure 4:
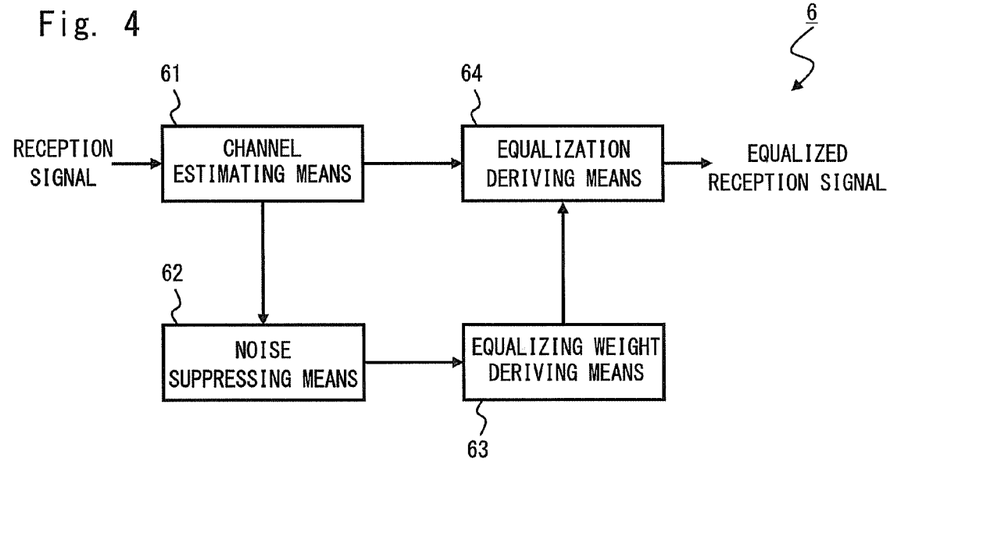
FIG. 4 is a block diagram showing one example of an equalizing processing unit according to the first comparative example.

As shown in FIG. 4, the equalizing processing means 6 includes channel estimating means 61, noise suppressing means 62, equalizing weight deriving means 63, equalization deriving means 64 and the like.

Then, the equalizing processing means 6 performs an equalizing process on a reception signal.

Firstly, a description will be given of the equalizing process performed by the equalizing processing means 6.

The channel estimating means 61 estimates a channel estimation value H'(k) using a reception signal (k is a positive integer satisfying $0 \le k \le N-1$, where N is the number of subcarriers in the signal band). Here, the reception signal input to the channel estimating means 61 is converted from the radio frequency to the baseband frequency.

Further, the channel estimating means 61 inputs the channel estimation value H'(k) to the noise suppressing means 62 and the equalization deriving means 64.

The noise suppressing means 62 performs a noise suppressing process on the channel estimation value H'(k). For example, the noise suppressing means 62 estimates the channel of each subcarrier using the channel estimation value H'(k); derives the average value of the channels of all the subcarriers; and employs the average value as a channel estimation value having undergone the noise process H(k) (k is a positive integer satisfying $0 \le k \le N-1$, where N is the number of subcarriers in the signal band). Here, the number of subcarriers is an arbitrary value. Based on the previously acquired characteristic of a reception signal or the like, the value is set by a user or the like so as to achieve the optimum characteristic.

Further, the noise suppressing means 62 inputs the channel estimation value having undergone the noise process H(k) to the equalizing weight deriving means 63.

The equalizing weight deriving means 63 derives an equalizing weight W(k) using the channel estimation value having undergone the noise process H(k) (k is a positive integer satisfying 0≤k≤N−1, where N is the number of subcarriers in the signal band). In deriving the equalizing weight W(k), for example, an algorithm such as the minimum mean square error (MMSE) method can be used. More specifically, the equalizing weight deriving means 63 derives the weight with which the error (mean square error) between the channel estimation value having undergone the noise process H(k) and a predetermined channel estimation value is minimized, and employs the weight as the equalizing weight W(k).

Further, the equalizing weight deriving means 63 inputs the equalizing weight W(k) to the equalization deriving means 64.

The equalization deriving means 64 multiplies the channel estimation value H'(k) and the equalizing weight W(k) together for each subcarrier, to derive an equalized reception signal Y(k) (k is a positive integer satisfying 0≤k≤N−1, where N is the number of subcarriers in the signal band).

Further, the equalization deriving means 14 inputs the equalized reception signal Y(k) to the lattice distance estimating means 7.

The equalized reception signal Y(k) derived by the equalization deriving means 64 is expressed by the following Equation (8).

[Mathematical Expression 8]

$$Y(k) = W(k)H'(k) \quad (8)$$

Next, a description will be given of the processes performed by the lattice distance estimating means 7, the RSSI estimating means 8, the ISSI estimating means 9, and the dividing means 10.

The lattice distance estimating means 2 derives a lattice distance estimation value LD using the equalized reception signal Y(k). The lattice distance estimation value LD is expressed by the following Equation (9).

[Mathematical Expression 9]

$$LD = 1 - \text{real}\left(\frac{1}{N}\sum_{k=0}^{N-1} e(k)\right) \quad (9)$$

Note that, in Equation (9), e(k) represents the posterior error between the ideal equalized reception signal and the equalized reception signal Y(k) output from the equalizing processing means 6. Here, the posterior error is an error evaluated by means of the posterior error evaluation. In the posterior error evaluation, the absolute difference between a calculated numerical solution and an exact solution is evaluated.

Figure 5:
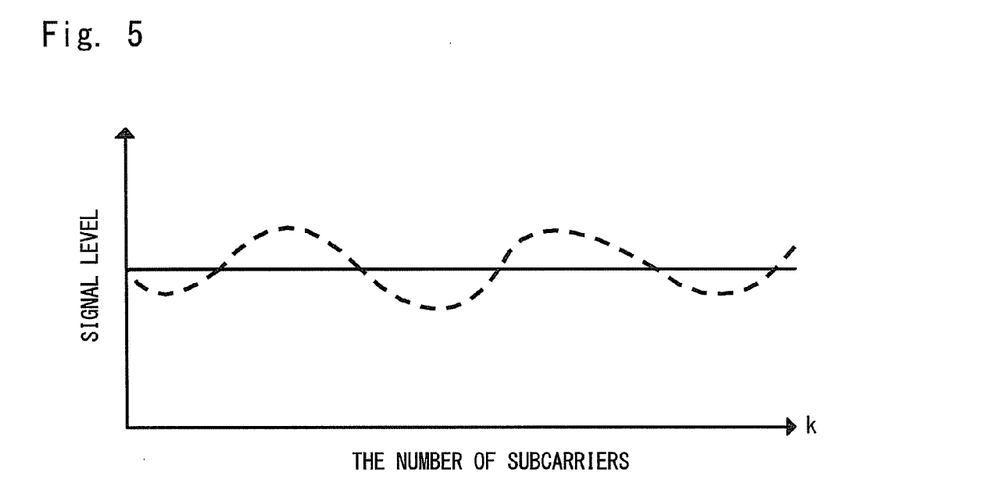
FIG. 5 is a graph showing the characteristic of an ideal equalized reception signal and that of an equalized reception signal output from the equalizing processing means according to the first comparative example.

FIG. 5 shows the characteristic of the ideal equalized reception signal and that of the equalized reception signal output from the equalizing processing means 6 according to the first comparative example. In FIG. 5, the ideal equalized reception signal is represented by a solid line, and the equalized reception signal output from the equalizing processing means 6 according to the first comparative example is represented by a broken line.

As shown in FIG. 5, with the ideal equalized reception signal, the noise signal component in the equalizing process can be regarded as 0. Therefore, the value of the ideal equalized reception signal becomes 1. Accordingly, the posterior error e(k) is expressed by the following Equation (10).

[Mathematical Expression 10]

$$e(k) = 1 - Y(k) \quad (10)$$

Then, from Equations (9) and (10), the lattice distance estimation value LD is expressed by the following Equation (11).

[Mathematical Expression 11]

$$LD = \text{real}\left(\frac{1}{N}\sum_{k=0}^{N-1} Y(k)\right) \quad (11)$$

Further, the lattice distance estimating means 7 inputs the lattice distance estimation value LD to the RSSI estimating means 8 and the ISSI estimating means 9.

The RSSI estimating means 8 derives an RSSI (Received Signal Strength Indicator) estimation value using the equalized reception signal Y(k). The RSSI estimation value is expressed by the following Equation (12).

[Mathematical Expression 12]

$$RSSI = \left(\text{real}\left(\frac{1}{N}\sum_{k=0}^{N-1} Y(k)\right)\right)^2 = LD^2 \quad (12)$$

The RSSI estimation value is an electric power value obtained by subjecting the equalized reception signal Y(k) to in-phase addition by the number of subcarriers in the signal band, and can be expressed only by the lattice distance estimation value LD as shown in Equation (12). Note that, in Equation (12), real(X) represents the real part of X, and RSSI represents the RSSI estimation value.

Further, the RSSI estimating means 8 inputs the RSSI estimation value to the ISSI estimating means 9 and the dividing means 10.

The ISSI estimating means 9 includes total reception power estimating means 91, subtracting means 92 and the like.

The total reception power estimating means 91 derives the addition average value of the electric power of the equalized reception signal Y(k) using the number of subcarriers in the signal band, and employs the average value as the total reception power estimation value. Specifically, the total reception power estimation value is expressed by the following Equation (13).

[Mathematical Expression 13]

$$\text{TOTAL RECEPTION POWER ESTIMATION VALUE} = \quad (13)$$

$$\frac{1}{N}\sum_{k=0}^{N-1} |Y(k)|^2$$

Further, the total reception power estimating means 91 inputs the total reception power estimation value to the subtracting means 92.

The subtracting means 92 subtracts the RSSI estimation value from the total reception power estimation value, to derive the ISSI estimation value. Specifically, the ISSI estimation value is expressed by the following Equation (14).

[Mathematical Expression 14]

$$ISSI = \text{TOTAL RECEPTION POWER ESTIMATION VALUE} - RSSI = \frac{1}{N}\sum_{k=0}^{N-1}|Y(k)|^2 - LD^2 \quad (14)$$

Note that, in Equation (14), ISSI represents the ISSI estimation value, and RSSI represents the RSSI estimation value.

Further, the ISSI estimating means 9 inputs the ISSI estimation value to the dividing means 10.

The dividing means 10 divides the RSSI estimation value by the ISSI estimation value, to derive a desired signal to interference signal ratio (SIR: Signal to Interference power Ratio) which represents the reception quality.

As has been described in the foregoing, with the ISSI estimating means 9 according to the first comparative example, ISSI estimation value cannot be derived unless the total reception power estimation value of the equalized reception signal Y(k) is derived. Then, as shown in Equation (13), in order to derive the total reception power estimation value, the addition average value of the electric power of the equalized reception signal Y(k) is derived using the number of subcarriers in the signal band. Therefore, the calculation amount of the addition averaging process is great, whereby the calculation amount of the entire reception quality measuring apparatus 200 becomes great.

With the reception quality measuring apparatus 100 and the reception quality measuring method according to the first embodiment of the present invention described above, the equalizing processing means 1 performs the equalizing process on a reception signal, to derive an equalized reception signal Y(k). Further, the lattice distance estimating means 2 derives a lattice distance estimation value LD using the equalized reception signal Y(k). Still further, the RSSI estimating means 3 derives an RSSI estimation value using the lattice distance estimation value LD. The ISSI estimating means 4 subtracts the RSSI estimation value from the lattice distance estimation value LD, to calculate an ISSI estimation value. Further, the dividing means 5 divides the RSSI estimation value by the ISSI estimation value, to derive an SIR representing the reception quality.

Therefore, according to the reception quality measuring apparatus 100 and the reception quality measuring method according to the first embodiment of the present invention, the ISSI estimation value can be derived just by the ISSI estimating means 4 subtracting the RSSI estimation value from the lattice distance estimation value LD. Thus, the reception quality of a reception signal can be measured with a smaller calculation amount.

Further, according to the reception quality measuring apparatus 100 and the reception quality measuring method according to the first embodiment of the present invention, the equalizing processing means 1 includes the channel estimating means 11, the noise suppressing means 12, the equalizing weight deriving means 13, and the equalization deriving means 14. Still further, the channel estimating means 11 estimates a channel estimation value H'(k) of the reception signal. Still further, the noise suppressing means 12 performs the noise process on the channel estimation value H'(k). Still further, the equalizing weight deriving means 13 derives an equalizing weight W(k) using the channel estimation value having undergone the noise process H(k). Still further, the equalization deriving means 14 derives an equalized reception signal Y(k) using the channel estimation value H(k) having undergone the noise process and the equalizing weight W(k).

More specifically, when the channel estimation value having undergone the noise process is H(k) and the equalizing weight is W(k), the equalized reception signal Y(k) is expressed by the foregoing Equation (1).

Therefore, the expected value of the electric power of the equalized reception signal Y(k) can be represented by the lattice distance estimation value LD. Thus, just by the ISSI estimating means 4 subtracting the RSSI estimation value from the lattice distance estimation value LD, the ISSI estimation value can be derived.

In the foregoing, though the present invention has been described with reference to the embodiment, the present invention is not limited thereby. The structure and details of the present invention can be changed in various manners that can be understood by a person skilled in the art within the scope of the invention.

The present application claims priority to Japanese Patent Application No. 2012-204459 filed on Sep. 18, 2012, the disclosure of which is incorporated by reference herein in its entirety.

INDUSTRIAL APPLICABILITY

A reception quality measuring apparatus and a reception quality measuring method with which the reception quality of a reception signal can be measured with a smaller calculation amount can be provided.

REFERENCE SIGNS LIST 1 equalizing processing means
11 channel estimating means
12 noise suppressing means
13 equalizing weight deriving means
14 equalization deriving means
2 lattice distance estimating means
3 RSSI estimating means
4 ISSI estimating means
41 subtracting means
5 dividing means
6 equalizing processing means
61 channel estimating means
62 noise suppressing means
63 equalizing weight deriving means
64 equalization deriving means
7 lattice distance estimating means
8 RSSI estimating means
9 ISSI estimating means
91 total reception power estimating means
92 subtracting means
10 dividing means
100, 200 reception quality measuring apparatus

The invention claimed is:
1. A reception quality measuring apparatus comprising:
equalizing processing unit that performs an equalizing process on a reception signal to derive an equalized reception signal;
lattice distance estimating unit that derives a lattice distance estimation value using only real components of the equalized reception signal;
RSSI estimating unit that derives an RSSI estimation value using the lattice distance estimation value;

ISSI estimating unit that derives an ISSI estimation value by subtracting the RSSI estimation value from the lattice distance estimation value; and dividing unit that derives an SIR representing reception quality by dividing the RSSI estimation value by the ISSI estimation value.

2. The reception quality measuring apparatus according to claim 1, wherein the equalizing processing unit includes channel estimating unit, noise suppressing unit, equalizing weight deriving unit, and equalization deriving unit, the channel estimating unit estimates a channel estimation value of the reception signal, the noise suppressing unit performs a noise process on the channel estimation value, the equalizing weight deriving unit derives an equalizing weight using the channel estimation value having undergone the noise process, and the equalization deriving unit derives the equalized reception signal using the channel estimation value having undergone the noise process and the equalizing weight.

3. The reception quality measuring apparatus according to claim 2, wherein, when the channel estimation value having undergone the noise process is H(k), and the equalizing weight is W(k), the equalized reception signal Y(k) is expressed by Equation (1) shown below:

[Mathematical Expression 1]

$$Y(k)=W(k)H(k). \tag{1}$$

4. The reception quality measuring apparatus according to claim 3, wherein an expected value of the electric power of the equalized reception signal Y(k) is represented by the lattice distance estimation value.

5. The reception quality measuring apparatus according to claim 2, wherein an expected value of the electric power of the equalized reception signal is represented by the lattice distance estimation value.

6. A reception quality measuring method comprising:

performing an equalizing process on a reception signal to derive an equalized reception signal;

deriving a lattice distance estimation value using only real components of the equalized reception signal;

deriving an RSSI estimation value using the lattice distance estimation value;

deriving an ISSI estimation value by subtracting the RSSI estimation value from the lattice distance estimation value; and deriving an SIR representing reception quality by dividing the RSSI estimation value by the ISSI estimation value.

7. The reception quality measuring method according to claim 6, wherein the equalizing process includes:

estimating a channel estimation value of the reception signal;

performing a noise process on the channel estimation value;

deriving an equalizing weight using the channel estimation value having undergone the noise process; and deriving the equalized reception signal using the channel estimation value having undergone the noise process and the equalizing weight.

8. The reception quality measuring method according to claim 7, wherein, when the channel estimation value having undergone the noise process is H(k), and the equalizing weight is W(k), the equalized reception signal Y(k) is expressed by Equation (1) shown below:

[Mathematical Expression 1]

$$Y(k)=W(k)H(k). \tag{1}$$

9. The reception quality measuring method according to claim 8, wherein an expected value of the electric power of the equalized reception signal Y(k) is represented by the lattice distance estimation value.

10. The reception quality measuring method according to claim 7, wherein an expected value of the electric power of the equalized reception signal is represented by the lattice distance estimation value.

\* \* \* \* \*